US011335377B1

(12) United States Patent
Harper et al.

(10) Patent No.: US 11,335,377 B1
(45) Date of Patent: May 17, 2022

(54) BLOCKING MECHANISM FOR A STORAGE CARTRIDGE TO PREVENT INSERTION INTO A STORAGE DRIVE

(71) Applicant: INTERNATIONAL BUSINESS MACHINES CORPORATION, Armonk, NY (US)

(72) Inventors: David Harper, Vail, AZ (US); Edwin Ralph Childers, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/397,972

(22) Filed: Aug. 9, 2021

(51) Int. Cl.
G11B 23/28 (2006.01)
G11B 5/78 (2006.01)

(52) U.S. Cl.
CPC ............... G11B 23/28 (2013.01); G11B 5/78 (2013.01)

(58) Field of Classification Search
CPC .......... G11B 23/28; G11B 5/78; G11B 23/287
See application file for complete search history.

(56) References Cited

U.S. PATENT DOCUMENTS

| 4,602,299 A * | 7/1986 | Saito | G11B 15/04 360/132 |
| 4,628,713 A * | 12/1986 | Cecchi | E05B 73/0023 360/132 |
| 4,716,745 A * | 1/1988 | Hehn | E05B 15/143 70/370 |
| 4,763,784 A * | 8/1988 | Newell | G11B 23/049 206/387.11 |
| 4,895,253 A * | 1/1990 | Yaeger | G11B 23/00 206/1.5 |
| 4,908,728 A * | 3/1990 | Pinkett | G11B 23/28 292/42 |
| 5,261,259 A * | 11/1993 | Ployd | G11B 23/08714 292/DIG. 38 |
| 5,289,914 A * | 3/1994 | Holmgren | E05B 73/0023 206/1.5 |
| 5,404,733 A * | 4/1995 | Fitzpatrick | G11B 33/005 70/14 |
| RE34,927 E * | 5/1995 | Meguro | G11B 23/08735 360/96.51 |
| 6,046,880 A * | 4/2000 | Markus | G11B 23/287 360/99.06 |
| 6,111,713 A * | 8/2000 | Sawai | G11B 23/28 360/60 |
| 7,477,484 B2 | 1/2009 | Vanderheyden et al. | |
| 9,336,815 B1 | 5/2016 | Trachy et al. | |

(Continued)

Primary Examiner — Brian E Miller
(74) Attorney, Agent, or Firm — Konrad Raynes Davda & Victor LLP; David W. Victor

(57) ABSTRACT

Provided are a storage cartridge, system, and method for a blocking mechanism for a storage cartridge to prevent insertion into a storage drive. The storage cartridge includes an outer surface having an opening, a blocking mechanism disposed within the storage cartridge, wherein in an unreleased state an end of the blocking mechanism is positioned at the opening in the outer surface, and a releasing mechanism coupled to the blocking mechanism in the unreleased state and to engage the blocking mechanism to urge the blocking mechanism to extend through the opening past the outer surface in a released state in a manner that prevents the storage cartridge from being inserted into the storage drive.

20 Claims, 10 Drawing Sheets

(56) References Cited

U.S. PATENT DOCUMENTS

| | | | |
|---|---|---|---|
| 2003/0156356 A1 | 8/2003 | Argumedo et al. | |
| 2011/0058331 A1* | 3/2011 | Mesfin | G06F 1/187 361/679.57 |
| 2012/0286633 A1 | 11/2012 | Hashimoto | |

* cited by examiner

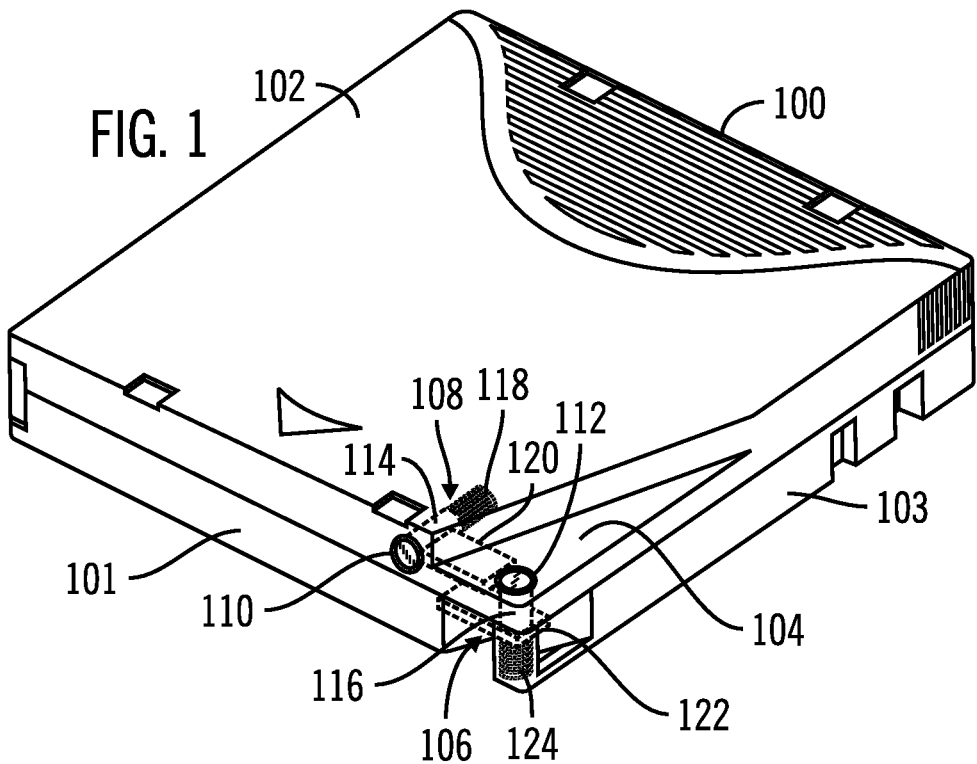
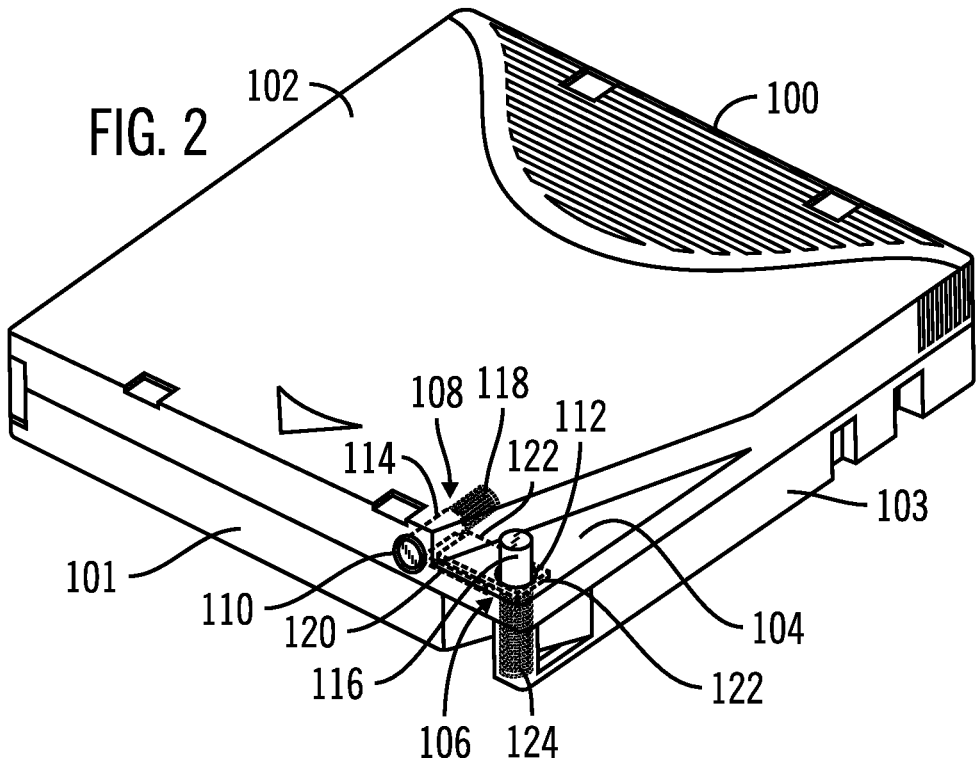

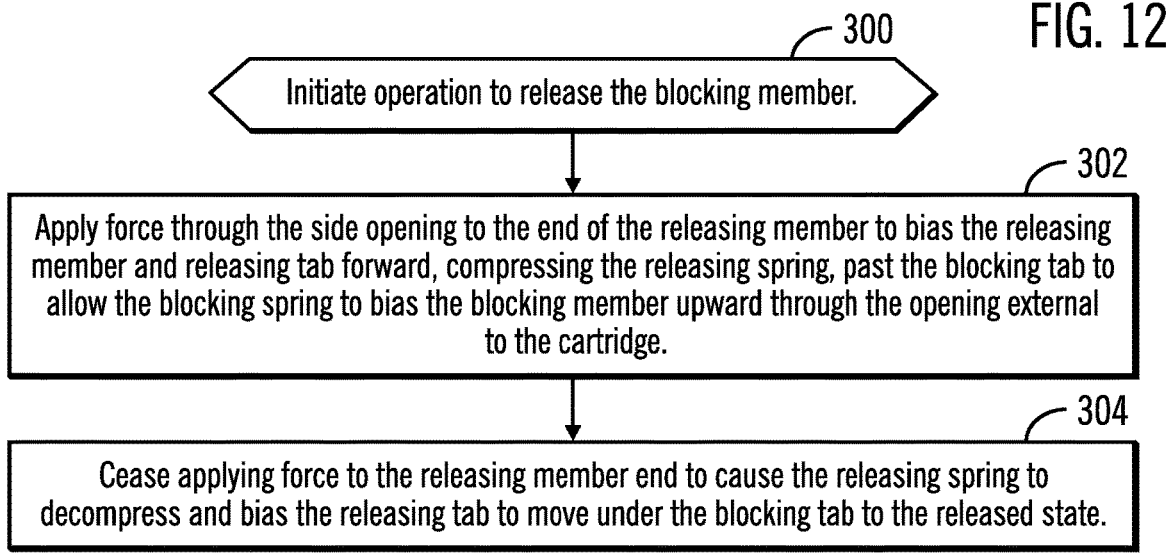
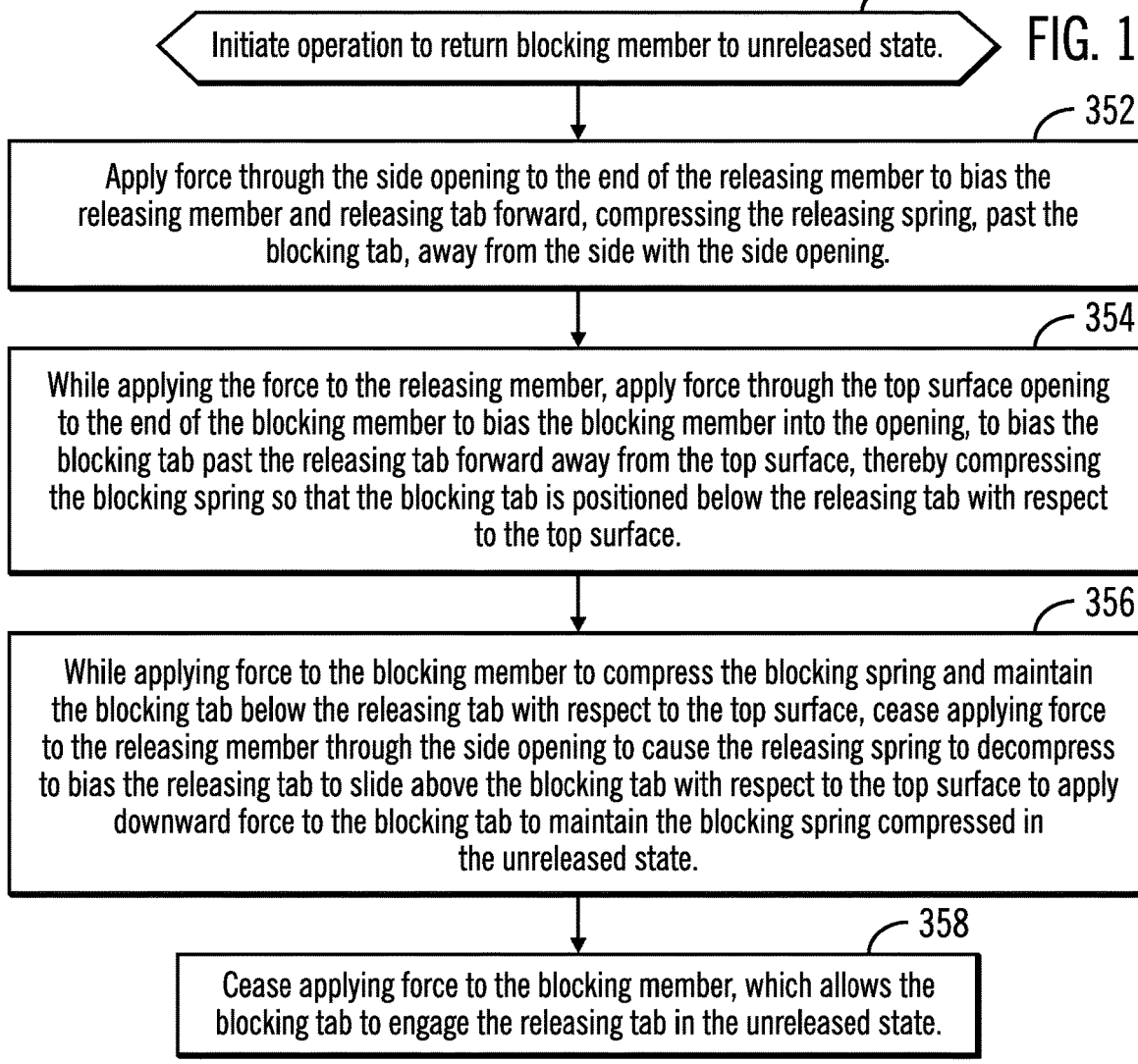

BLOCKING MECHANISM FOR A STORAGE CARTRIDGE TO PREVENT INSERTION INTO A STORAGE DRIVE

BACKGROUND OF THE INVENTION

1. Field of the Invention

Provided are a storage cartridge, system, and method for a blocking mechanism for a storage cartridge to prevent insertion into a storage drive.

2. Description of the Related Art

In a tape storage system, such as the Linear Tape Open (LTO) magnetic storage systems, data is read from and written onto magnetic recording media within an LTO tape cartridge when inserted into a tape drive. The tape drive may be part of a tape library.

LTO tape cartridges include a mechanical write-protect switch that when moved to the write protect position will prevent the data in the tape cartridge from being overwritten to preserve the data in the tape cartridge and avoid the situation where someone inadvertently re-inserts the tape cartridge in the tape drive and overwrites data that was intended to be maintained in the tape cartridge.

There is a need in the art for improved techniques for protecting data in a storage cartridge, such as a tape cartridge.

SUMMARY

Provided are a storage cartridge, system, and method for a blocking mechanism for a storage cartridge to prevent insertion into a storage drive. The storage cartridge includes an outer surface having an opening, a blocking mechanism disposed within the storage cartridge, wherein in an unreleased state an end of the blocking mechanism is positioned at the opening in the outer surface, and a releasing mechanism coupled to the blocking mechanism in the unreleased state and to engage the blocking mechanism to urge the blocking mechanism to extend through the opening past the outer surface in a released state in a manner that prevents the storage cartridge from being inserted into the storage drive.

BRIEF DESCRIPTION OF THE DRAWINGS

FIG. 1 illustrates an embodiment of a storage cartridge having a blocking mechanism in an unreleased state.

FIG. 2 illustrates an embodiment of a storage cartridge having a blocking mechanism in a released state.

FIG. 12 illustrates an embodiment of operations to release a blocking member of the blocking mechanism.

FIG. 13 illustrates an embodiment of operations to return the blocking member to the unreleased state.

DETAILED DESCRIPTION

Figure 3:
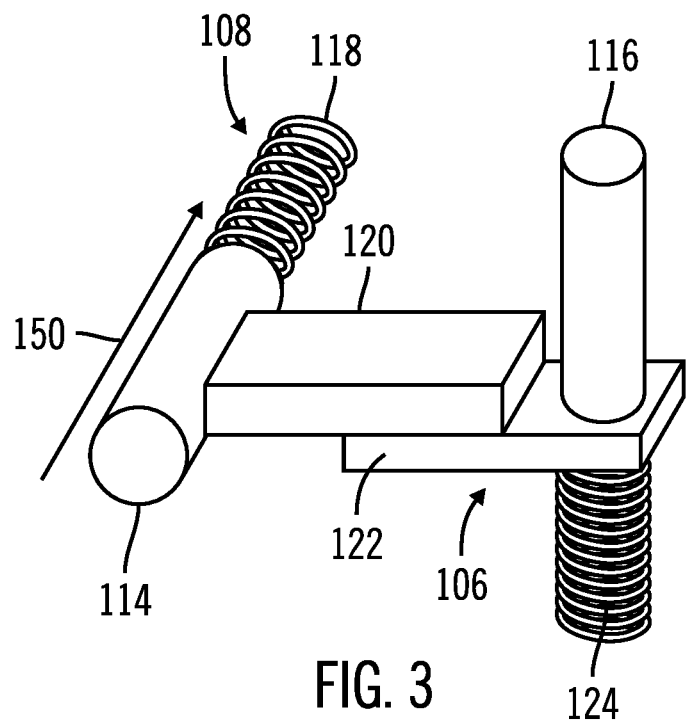
FIG. 3 illustrates an embodiment of the blocking mechanism and releasing mechanism in the unreleased state.

Current LTO tape cartridges include a write-protect switch that can be moved to a protect or lock position to prevent data being written to the tape cartridge that would overwrite current data in the cartridge. However, the write-protect switch can be easily switched back to unprotected, which may result in inadvertent overwriting of protected data or allow an unauthorized person or process to easily manually change the write-protect switch to access the data to overwrite with malicious data, such as ransomware encrypted data, or read the data.

Described embodiments provide improvements to write protect technology for a tape cartridge by providing a blocking mechanism that once activated prevents the tape cartridge from being reinserted into the tape drive. The blocking mechanism may include a releasing mechanism that when mechanically engaged releases the blocking mechanism to cause a blocking member, such as a pin, to extend through an opening in the cartridge housing in a manner that would physically prevent the tape cartridge from being inserted into the receiving slot of the tape drive. This blocking mechanism may not be easily released, such as the case with a write-protect switch on an LTO cartridge, and would require a special tool or special knowledge of the operations needed to release the blocking mechanism to lower the blocking member to allow insertion into a tape drive.

Further, with described embodiments, by releasing the blocking member for a tape cartridge in a tape library, a malicious user cannot control the gripper assembly in the tape library to insert the tape cartridge in a tape drive because the blocking member extending past the cartridge housing would prevent insertion into the tape drive. Further, the extension of the blocking member would also reduce occurrence of an authorized user from controlling the gripper assembly from inserting the tape cartridge in a tape drive and inadvertently overwriting the tape cartridge data by requiring a more intentional and extended procedure to retract the blocking member back into the tape cartridge than merely manually switching a write-protect switch.

FIG. 1 illustrates an embodiment of a tape cartridge 100, also referred to as a storage cartridge, having a top surface 102 with a notch indentation 104 formed on the top surface to mate with the configuration of a slot in a tape drive in which the cartridge 100 is inserted. The notch indentation 104 extends along sides 101 and 103 of the cartridge. Embedded within the housing of the tape cartridge 100 is a blocking mechanism 106 and a releasing mechanism 108. In an unreleased state, an end of a releasing member 114, which may be in the shape of a cylinder, of the releasing mechanism 108 is flush, e.g., even or level, with a side opening 110 on the side 101 of the cartridge, and does not extend through the opening past an outer surface of the side 101 of the cartridge 100. In the unreleased state, a blocking member 116, which may be in the shape of a cylinder, is flush with the top surface opening 112 in the notch 104 and does not extend through the top surface opening 112 external to the cartridge 100.

The releasing mechanism 108 includes a releasing spring 118 and a releasing tab 120 that in an unreleased state is between the surface 102 and a blocking tab 122 of the blocking mechanism 106. The releasing tab 120 in the unreleased state shown in FIG. 1 engages the blocking tab 122 with a blocking spring 124 in a compressed state that blocks the blocking mechanism from moving upward to extend through the top surface opening 112 to a region external to the surface 102 of the cartridge 100.

There would be a stop on the end of the springs 118 and 124 not engaged with the members 114, 116 to allow compression and decompression from the members 114, 116.

FIG. 2 illustrates an embodiment of the cartridge 100 in a released state where the blocking member 116 extends through the top surface opening 112 external to the surface of the notch 104 indentation of the surface 102. In the released state, the blocking tab 122 is between the surface 102 of the cartridge 100 and the release tab 120, and the blocking spring 124 is uncompressed to urge the blocking member 116 to extend through the top surface opening 112 external to the surface of the notch 104.

In the released state of FIG. 2, the cartridge 100 cannot be inserted into a standard Linear Tape Open (LTO) tape drive whose opening includes a guide to receive the notch region 104. The released and extended blocking member 116 would prevent the cartridge 100 from being fully inserted into an LTO tape drive.

Figure 4:
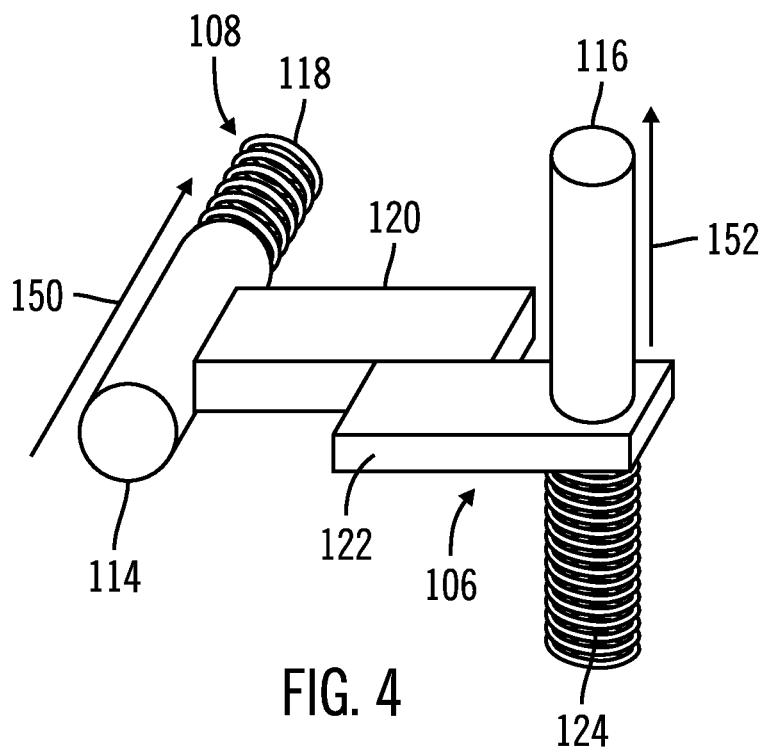
FIG. 4 illustrates an embodiment of the blocking mechanism and releasing mechanism in a transitory state between the unreleased state and the released state.
Figure 5:
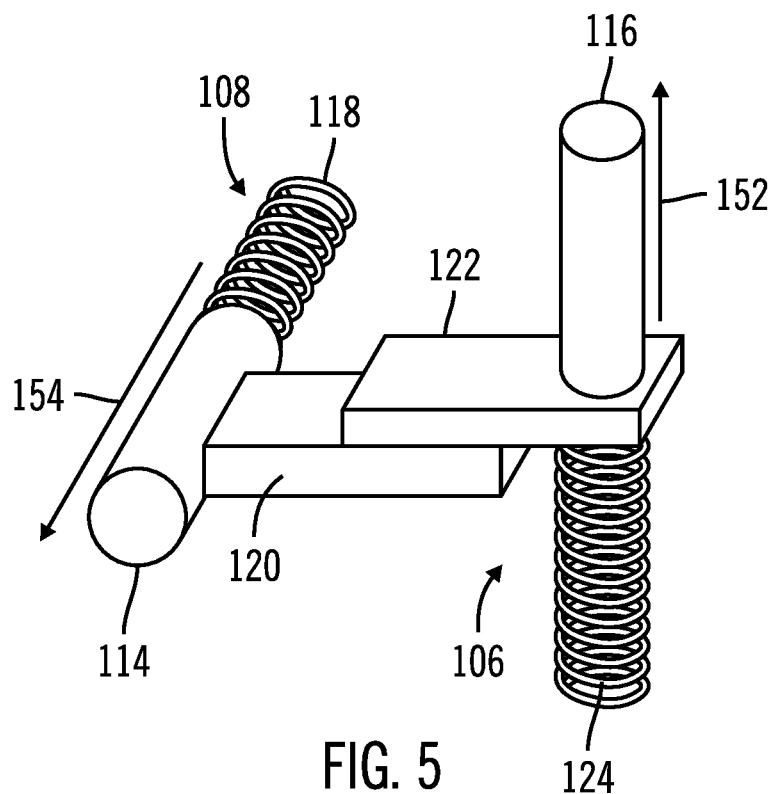
FIG. 5 illustrates an embodiment of the blocking mechanism and releasing mechanism in the released state.

FIGS. 3, 4, and 5 illustrate detailed views of the releasing mechanism 108 and the blocking mechanism 106. In FIG. 3, the mechanisms 106, 108 are in the unreleased state of FIG. 1, where the releasing tab 120 applies a downward force to the blocking tab 122 to compress the blocking spring 124 to prevent the spring 124 from decompressing to bias the blocking member 116 through the top surface opening 112 (FIG. 1). Applying a force through the side opening 110 to the releasing member 114 in direction 150 biases the releasing mechanism 108 in the direction 150 past the blocking tab 122, which results in a transitory state shown in FIG. 4.

In FIG. 4, the force applied in the direction 150 to the releasing member 114 compresses the releasing spring 118 and moves the releasing tab 120 past the blocking tab 122 to allow the blocking spring 124 to decompress and bias the blocking member 116 and blocking tab 122 in an upward direction 152, orthogonal to the direction 150, through the top surface opening 112 and past the releasing tab 120 biased away from engaging the blocking tab 122.

FIG. 5 illustrates the released state following the transitory state of FIG. 4, where the blocking spring 124 is fully decompressed to bias the blocking member 116 through the top surface opening 112, as shown in FIG. 2, to extend outward external from the notch 104 surface. To produce the released state shown in FIG. 5, the force applied to the releasing member 114 would be withdrawn, which would cause the releasing spring 118 to decompress and move the releasing member 114 in direction 154 to have the releasing tab 120 slide under the blocking tab 122 and position the end of the releasing member 114 flush with the side opening 110 (FIG. 2).

Once in the released state, shown in FIGS. 2 and 5, the blocking member 116 extends upward from the notch 104 surface to prevent physically obstruct the cartridge 100 being inserted into a tape drive.

Figure 6:
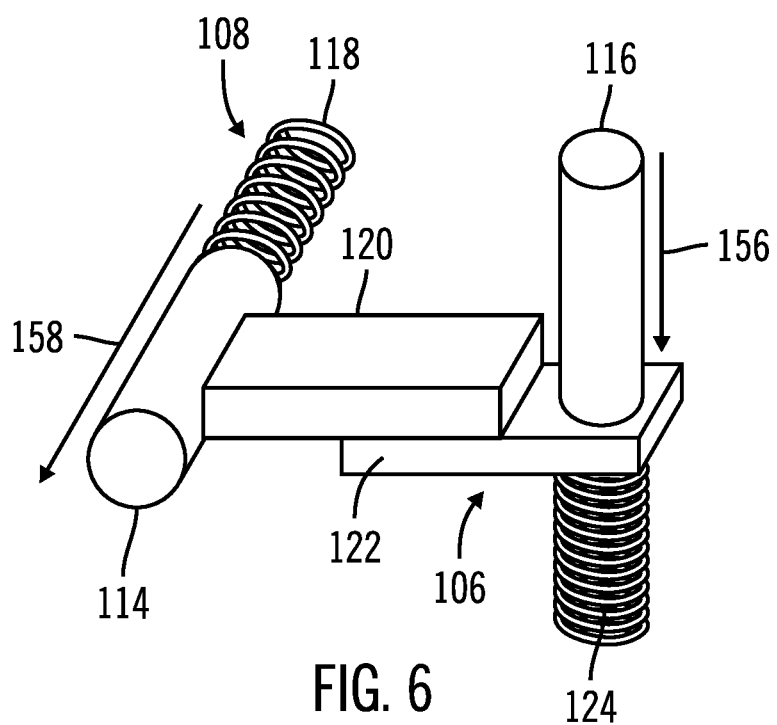
FIG. 6 illustrates an embodiment of the blocking mechanism and releasing mechanism transitioning to the unreleased state.

FIG. 6 illustrates a transition from the released state of FIG. 5 to the unreleased state of FIGS. 1 and 3 by applying a force to the releasing pin 114 of FIG. 5 to transition back to the transitory state of FIG. 4, where a further downward force may be applied to the blocking pin 116 in the direction 156, opposite force 152 of FIG. 4, to move the blocking tab 122 downward past releasing tab 120 in the transitory state of FIG. 4. Removing the force applied to the releasing pin 114 while the force 156 is a applied to the blocking pin 116 would then allow the releasing member 114 to move in direction 158 in FIG. 6 to slide over blocking tab 122 so that the blocking member 116 does not extend through the top surface 112 and the compressed spring 124 is held in place by the downward force exerted by the releasing tab 120 positioned between the notch 104 surface and the blocking tab 122.

Figure 7A:
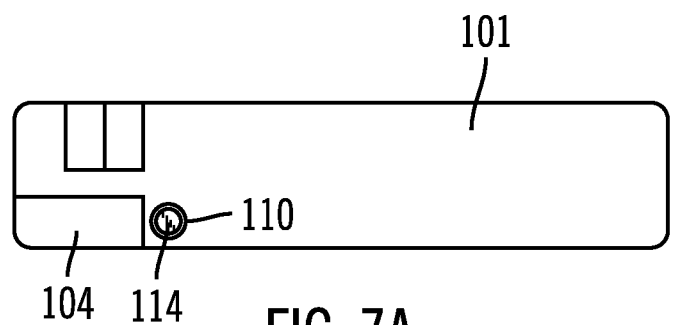
FIGS. 7a and 7b illustrate side views and FIG. 7c illustrates a top view of the storage cartridge in the unreleased state.
Figure 7C:
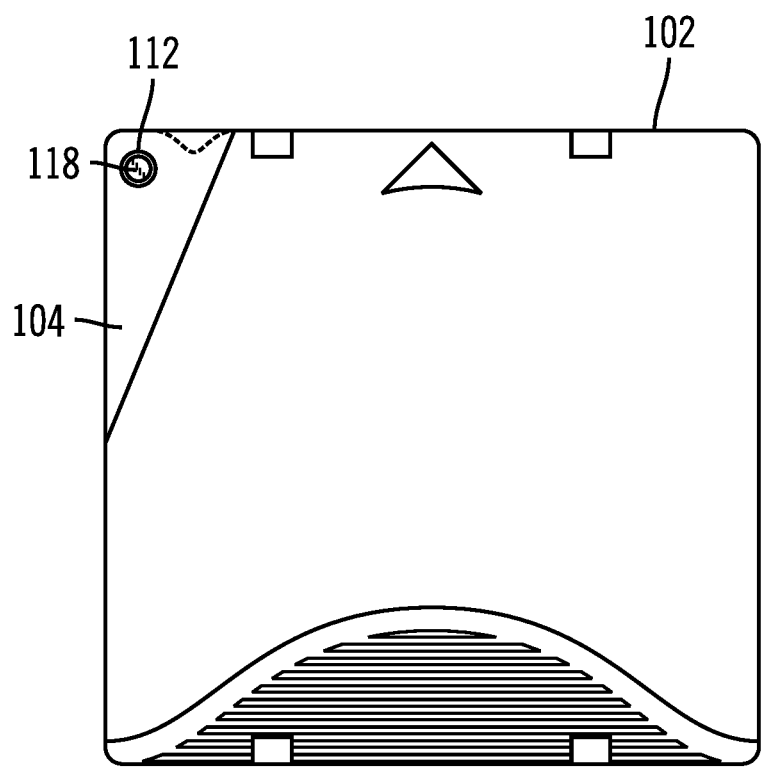
Figure 7B:
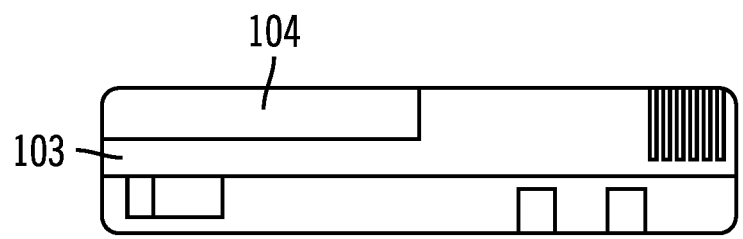

FIGS. 7a and 7b illustrate side views of the sides 101 and 103, respectively, shown in FIG. 1 in the unreleased state, where the blocking member 116 does not extend through the top surface opening 112 to outside the cartridge 100. FIG. 7a further shows the side opening 110 with the releasing member 114 flush with opening in the unreleased state. FIG. 7c is a top view of the surface 102 of the cartridge 100 showing the top surface opening 112 flush with the end of the blocking member 116.

Figure 7D:
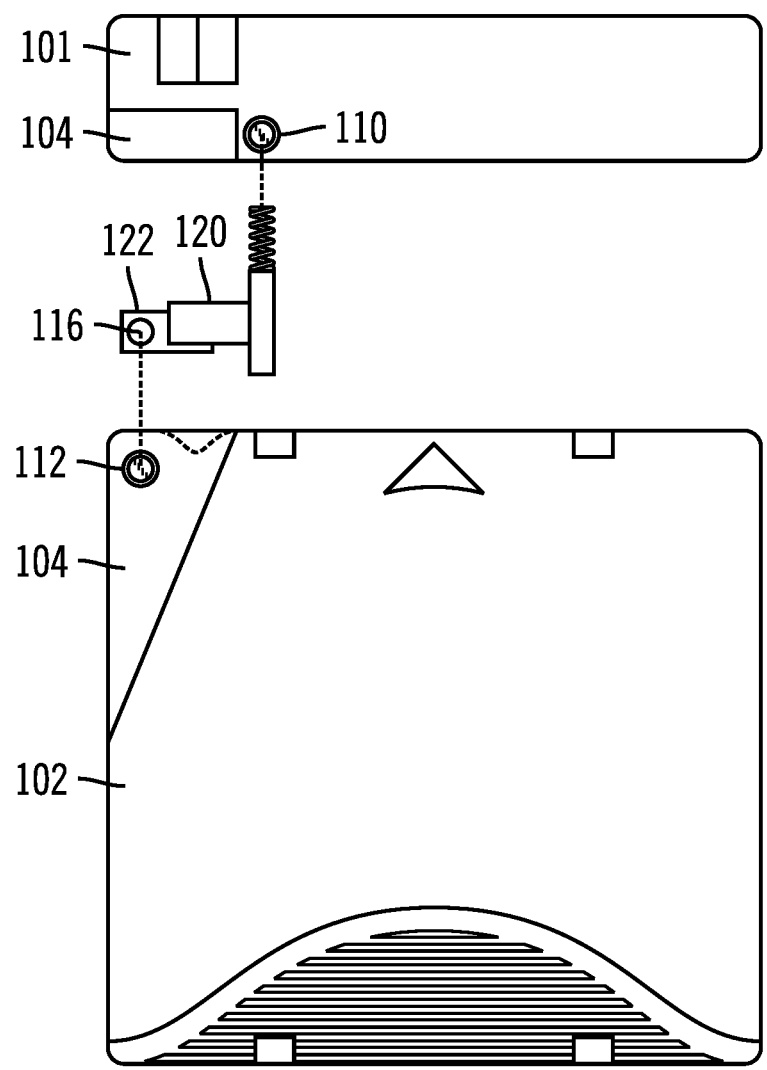
FIG. 7d illustrates a side view and top view of the cartridge in relation to the blocking mechanism and releasing mechanism in the unreleased state.

FIG. 7d provides a combined side view of the side 101 and the top view of the surface 102 in relation to the blocking tab 122 positioned below the releasing tab 120 in the unreleased state where the releasing tab 120 applies downward force on the blocking tab 122 to maintain the blocking spring 124 in the compressed/unreleased state.

Figure 8A:
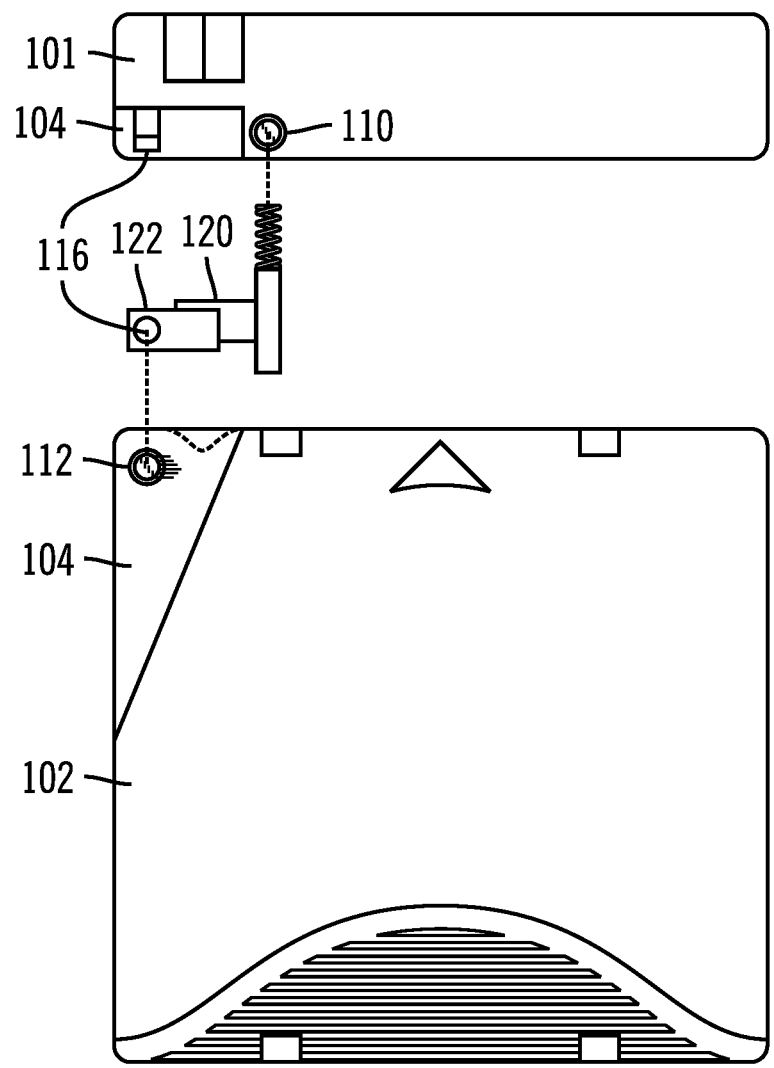
FIG. 8a illustrates a side view and top view of the cartridge in relation to the blocking mechanism and releasing mechanism in the released state.

FIG. 8a provides a combined side view of the side 101 and the top view of the surface 102 in relation to the blocking tab 122 positioned above the releasing tab 120 in the released state where the releasing tab 120 is biased by the uncompressed blocking spring 124 to bias the blocking member 116 upward through the top surface opening 112 in the decompressed/released state.

Figure 8B:
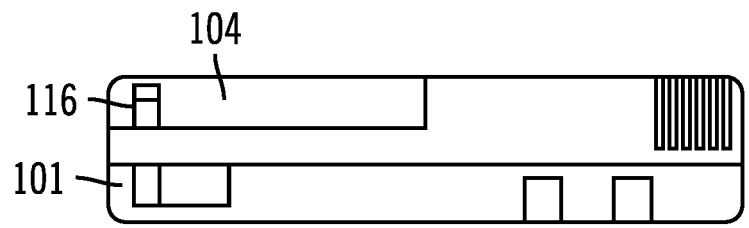
FIG. 8b illustrates a side view of the cartridge in the released state.

FIG. 8b provides a side view of the side 101 showing the blocking member 116 in the released state extending into the open space of the notch 104 indentation on the surface 102.

Figure 9:
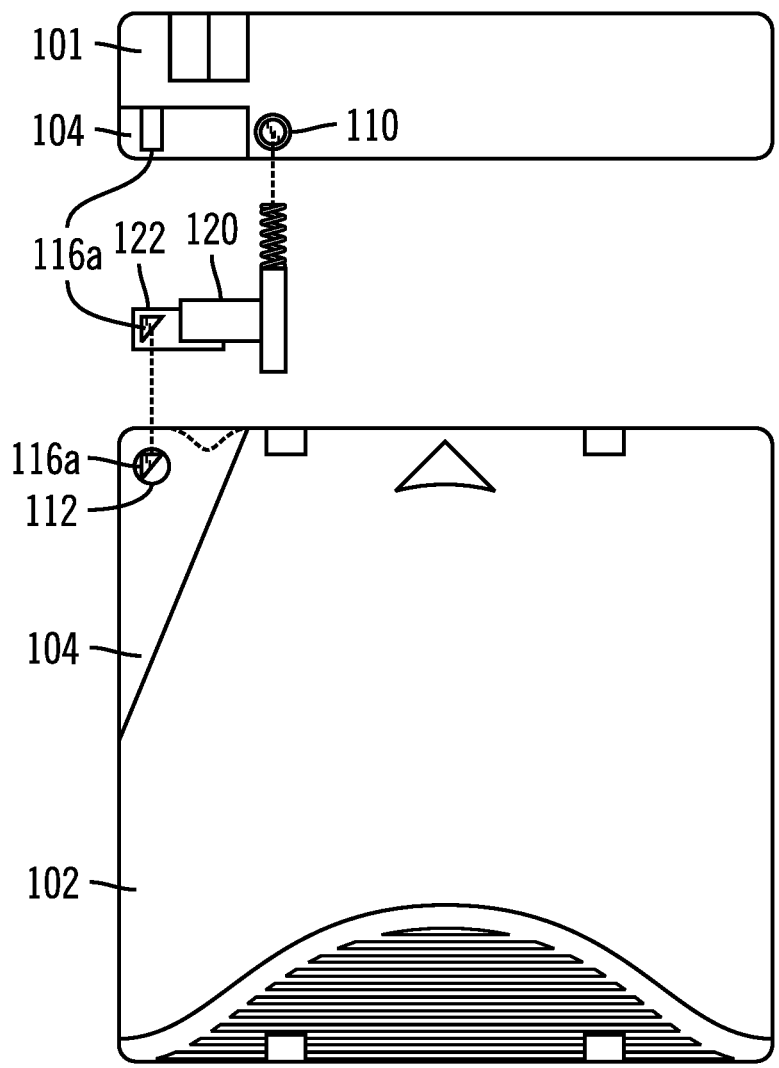
FIG. 9 illustrates an alternative embodiment of a side view and top view of the cartridge in relation to the blocking mechanism and releasing mechanism in the released state having a wedge-shaped blocking member.

In the above embodiments, the blocking member 116 has a cylindrical shape, such as a pin shape. In alternative embodiments, the blocking member 116 may have other shapes, such as wedge shaped, triangular, square, star, polygon, etc. FIG. 9 provides an alternative embodiment of a combined side view of the side 101 and the top view of the surface 102 in relation to the blocking tab 122 positioned below the releasing tab 120 in the unreleased state with a blocking member 116a having a triangular wedge shape, or non-cylindrical shape.

Figure 10:
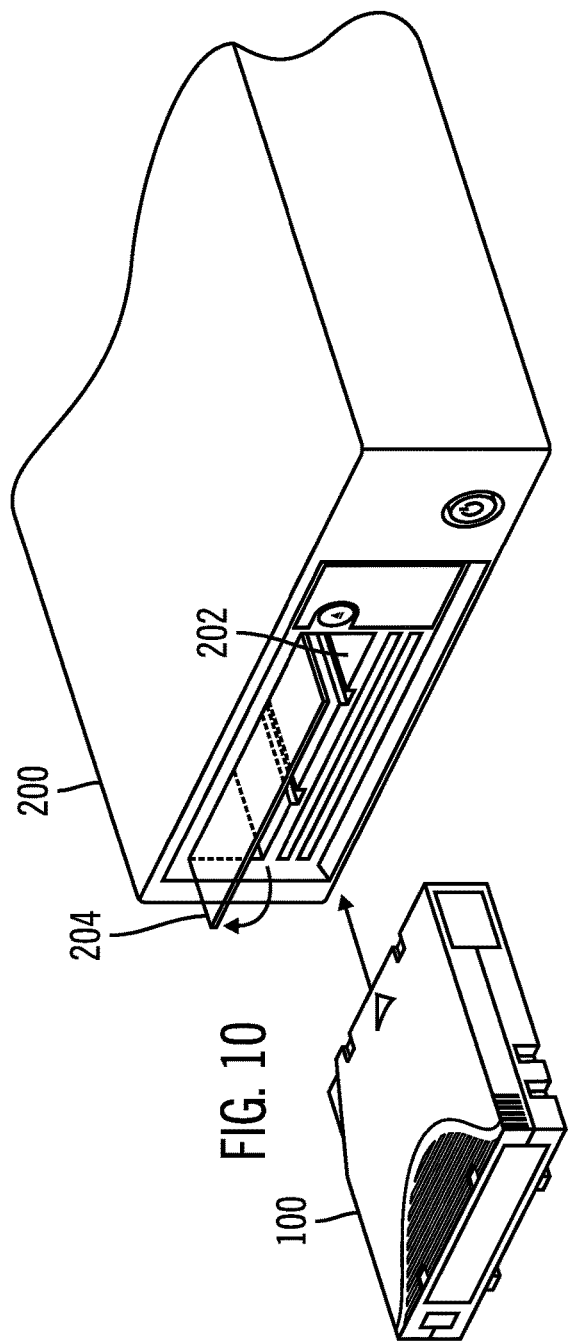
FIG. 10 illustrates an embodiment of a tape drive and a tape cartridge for insertion in the tape drive.

FIG. 10 illustrates an embodiment of a tape drive 200 in which the tape cartridge 100 may be inserted into a slot 202 of the tape drive when the slot door 204 is opened.

Figure 11:
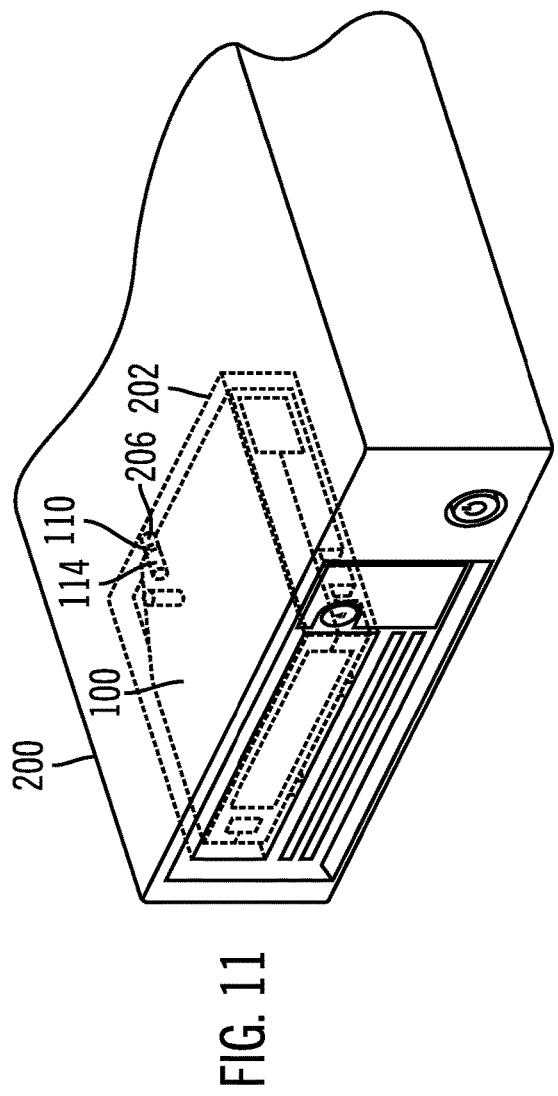
FIG. 11 illustrates an embodiment of the tape cartridge inserted in the tape drive having a release engagement member to release the blocking mechanism.

FIG. 11 illustrates an embodiment with the tape cartridge 100 fully inserted in the slot 202 of the tape drive 200. The tape drive 200 has a release engagement member 206 that may be activated through program control of the tape drive 200 to extend through the side opening 110 to apply force to an end of the releasing member 114 to move the releasing member 114 as shown in FIGS. 3, 4, and 5 from the unreleased state to the released state. Activating the releasing member 114 through the release engagement member 206 biases the blocking member 116 to extend upward through the top surface opening 112. While the cartridge 100 is inserted in the tape drive 200, the blocking member 116 would be prevented from extending though the top surface opening 112 by the configuration of the slot 202. When the cartridge 100 is ejected from the tape drive 200, then the blocking spring 124 would decompress and bias the blocking member 116 through the top surface opening 112 to subsequently block reinsertion of the cartridge 100 into the tape drive 200.

FIG. 12 illustrates an embodiment of operations to activate the blocking member 116 to extend through the top surface opening 112 and block the cartridge 100 from being inserted into a tape drive 200. Upon initiating (at block 300) the operation to activate the blocking member, a force is applied (at block 302) through the side opening 110 to the end of the releasing member 114 (FIGS. 1 and 3) to bias the releasing member 114 and releasing tab 120 forward, compressing the releasing spring 118, past the blocking tab 122, as shown in FIG. 4, to allow the blocking spring 124 to decompress and bias the blocking member 116 upward in direction 152 through the top surface opening 112 external to the cartridge 100. The application of force to the releasing member 114 is ceased (at block 304) to cause the releasing spring 118 to decompress as shown in FIG. 5 and bias the releasing tab 120 to move under the blocking tab 122 with respect to the top surface 102 to the released state.

The application and removal of force in FIG. 12 may be performed by a hand tool, pin or other mechanism, a user operates to apply the force to the releasing member 114. In an alternative embodiment, the operations of FIG. 12 may be performed in the tape drive 200 through a tape drive controller causing the releasing engagement member 206 to extend into the side opening 110 to apply forward force to the releasing member 114.

Figure 14:
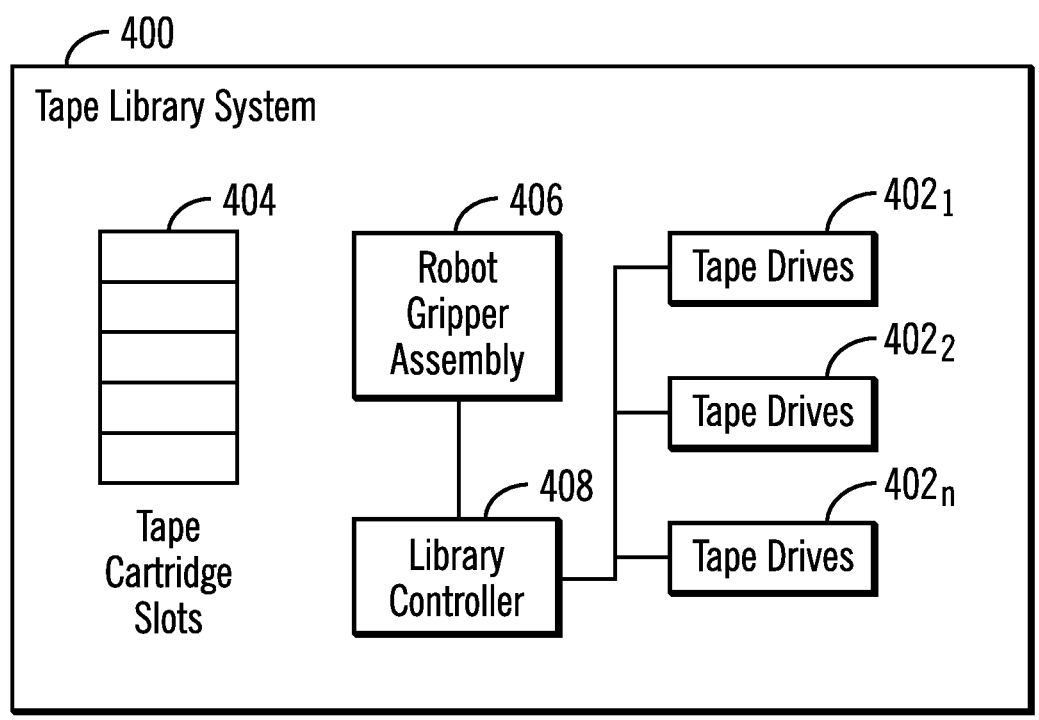
FIG. 14 illustrates an embodiment of a tape library system.

FIG. 14 illustrates a tape library system 400 having a plurality of tape drives $402_1$, $402_2$ . . . $402_n$, such as tape drive 200, and cartridge slots 404 to store tape cartridges 100. The tape library system 400 further includes a robot gripper assembly hand 406 to grip a tape cartridge 100 in one of the slots 404 and move the tape cartridge 100 to insert into an available tape drive $402_1$, $402_2$ . . . $402_n$. The robot gripper assembly hand 406 may grip and remove an ejected tape cartridge from a tape drive $402_1$, $402_2$ . . . $402_n$ to return to one of the slots 404. The tape library system 400 further includes a library controller 408 to control the operation of the gripper assembly 406 and the tape drives $402_1$, $402_2$ . . . $402_n$.

In a still further embodiment, the operations of FIG. 12 may be performed by a robot hand gripper assembly in a tape library upon removing the cartridge 100 from the tape drive 200 to place back in slots in the tape library. The robot gripper assembly may include a releasing engagement member 206 to apply the force to the releasing member 114 through the side opening 110. In the tape library embodiment, releasing the blocking member 116 physically prevents a malicious process from controlling a robot gripper assembly from re-inserting the tape cartridge 100 in a tape drive 200 to access the contents therein.

FIG. 13 illustrates an embodiment of operations to return the cartridge blocking mechanism 106 from the released state shown in FIG. 2 to the unreleased state of FIG. 1. Upon initiating (at block 350) the operation to return the extended blocking member 116 in the released state as shown in FIGS. 2, 5, 8a, 8b to the unreleased state, a force is applied (at block 352) through the side opening 110 to the end of the releasing member 114 to bias the releasing member 114 and releasing tab 120 forward, compressing the releasing spring 118. The releasing tab 120 is moved past the blocking tab 122 away from the side 101 with the side opening 110 as shown in FIG. 4. While applying the force to the releasing member 114, an additional force is applied (at block 354) through the top surface opening 112 to the end of the blocking member 116 in direction 156 (FIG. 6) to bias the blocking member 116 into the opening and to bias the blocking tab 122 past the releasing tab 120 in the direction 156 away from the top surface, thereby compressing the blocking spring 124 so that the blocking tab 122 is positioned below the releasing tab 120 with respect to the top surface 102. While applying force to the blocking tab 122 to compress the blocking spring 124 and maintain the blocking tab 122 below the releasing tab 120 with respect to the top surface 102, the force applied to the releasing tab 120 through the side opening 110 is removed (at block 356) to cause the releasing spring 118 to decompress to bias the releasing tab 120 to slide above the blocking tab 122 with respect to the top surface 102, as shown in FIG. 6, to apply downward force to the blocking tab 122. The application of force to the blocking member 116 is removed to allow the blocking spring 124 to decompress and the blocking tab 122 to move upward toward the top surface 102 to engage the bottom of the releasing tab 120 to maintain the blocking spring 124 compressed in the unreleased state as shown in FIG. 1, 6, 7a, 7b, 7c, 7d.

The application and removal of force in FIG. 13 may be performed by a hand tool a user operates to apply the force to the releasing member 114 (at block 352), apply the force to the blocking member 116 (at block 354), remove the force applied to the releasing member 114 (at block 356), and then remove the force applied to the blocking member 116 (at block 350). In a further embodiment, the operations of FIG. 13 may be performed by a robot hand gripper assembly in a tape library upon selecting the cartridge 100 from a slot in the tape library before inserting in the tape drive 200. The robot gripper assembly may include a releasing engagement member 206 to apply the force to the releasing member 114 through the side opening 110 and a blocking engagement member to apply force to the blocking member 116. The robot gripper assembly may only perform the operations in FIG. 13 to return the blocking member 116 to the unreleased state in response to a special command with high authorization to prevent a malicious process from removing the blocking member 116 from blocking the cartridge 100 from being inserted in the tape drive 200.

In described embodiments, the releasing mechanism 108 shown in FIGS. 1-11 is used to release the blocking mechanism 106 to the released state. In alternative embodiments, alternative releasing mechanisms, other than shown in FIGS. 1-11, may be used to move the blocking member 116 through the top surface opening 112 to extend above the notch region 104 to prevent the cartridge 100 from being inserted into a tape drive 200.

Described embodiments utilize the tape cartridge design of the LTO cartridge. In alternative embodiments, other cartridge designs may be used for other types of storage cartridges than an LTO tape cartridge.

In described embodiments, the cartridge 100 comprised a tape cartridge having a tape medium to be inserted into a tape drive 200. In alternative embodiments, the cartridge may include other types of storage medium, such as a floppy disk storage medium or other storage media requiring insertion into a drive assembly to read and write to the storage medium.

In described embodiments, the blocking mechanism 106 is operated through side 101 and the releasing mechanism 108 operates through side 103. In alternative embodiments, the blocking mechanism 106 and the releasing mechanism 108 may be in different locations and open into different sides 101 and 103 than shown in the figures.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A storage cartridge having a storage medium for insertion into a storage drive to read and write to the storage medium, comprising:

an outer surface having an opening;

a blocking mechanism disposed within the storage cartridge, wherein in an unreleased state an end of the blocking mechanism is positioned at the opening in the outer surface; and a releasing mechanism coupled to the blocking mechanism in the unreleased state and to engage the blocking mechanism to urge the blocking mechanism to extend through the opening past the outer surface in a released state in a manner that prevents the storage cartridge from being inserted into the storage drive.

2. The storage cartridge of claim 1, wherein in the unreleased state, the blocking mechanism does not extend through the opening past the outer surface.

3. The storage cartridge of claim 1, wherein the outer surface of the storage cartridge comprises a top surface of the storage cartridge, wherein the opening comprises a top surface opening, further comprising:

a side surface on a side of the storage cartridge having a side opening; and a releasing member, of the releasing mechanism, positioned at the side opening, wherein engagement of the releasing member at the side opening causes the blocking mechanism to transition from the unreleased state to the released state.

4. The storage cartridge of claim 3, wherein the top surface includes a notch indentation at a corner of the top surface, wherein the top surface opening is located in the notch indentation of the top surface, wherein while positioned in the storage drive the blocking mechanism extends through the top surface opening a first length and contacts a surface of the storage drive, wherein when removed from the storage drive, the blocking mechanism extends through the top surface opening a second length greater than the first length.

5. The storage cartridge of claim 1, wherein the releasing mechanism comprises:
a releasing tab; and
a release member attached to the releasing tab and coupled to a releasing spring,
wherein the blocking mechanism comprises:
a blocking tab coupled to a blocking member; and
a blocking spring coupled to the blocking tab, wherein in the unreleased state, the releasing tab is between the outer surface and the blocking tab to compress the blocking spring and inhibit the blocking spring from decompressing to bias the blocking member through the opening on the outer surface.

6. The storage cartridge of claim 5, wherein a force applied to the releasing member in a first direction compresses a releasing spring and moves the releasing tab past the blocking tab allowing the blocking spring to decompress and bias the blocking member and the blocking tab in a second direction toward the outer surface past the releasing tab to move the blocking member through the opening to transition to the released state in which the blocking tab is between the outer surface and the releasing tab.

7. The storage cartridge of claim 6, wherein the first direction is orthogonal to the second direction.

8. The storage cartridge of claim 6, wherein movement of the blocking tab past the releasing tab allows the releasing spring to decompress to bias the releasing member and the releasing tab in a third direction opposite the first direction to reach the released state.

9. A system, comprising:
a storage drive; and
a storage cartridge having a storage medium for insertion into a storage drive to read and write to the storage medium, comprising:
an outer surface having an opening;
a blocking mechanism disposed within the storage cartridge, wherein in an unreleased state an end of a blocking member is positioned at the opening in the outer surface; and
a releasing mechanism coupled to the blocking member in the unreleased state and to engage the blocking mechanism to urge the blocking member to extend through the opening past the outer surface in a released state in a manner that prevents the storage cartridge from being inserted into the storage drive.

10. The system of claim 9, wherein the storage drive further comprises:
a release engagement member that when activated while the storage cartridge is positioned in the storage drive engages the releasing mechanism to engage the blocking mechanism to urge the blocking member to extend through the opening past the outer surface in the released state.

11. The system of claim 10, wherein the outer surface of the storage cartridge comprises a top surface of the storage cartridge, wherein the opening comprises a top surface opening, further comprising:
a side surface on a side of the storage cartridge having a side opening; and
a releasing member, of the releasing mechanism, positioned at the side opening, wherein engagement of the releasing member at the side opening by the release engagement member causes the blocking member to transition from the unreleased state to the released state.

12. The system of claim 11, wherein the top surface includes a notch indentation at a corner of the top surface, wherein the top surface opening is located in the notch indentation of the top surface, wherein while positioned in the storage drive the blocking member extends through the top surface opening a first length and contacts a surface of the storage drive, wherein when removed from the storage drive, the blocking member extends through the top surface opening a second length greater than the first length.

13. The system of claim 9, further comprising:
a gripper assembly to engage the releasing mechanism to engage the blocking mechanism to urge the blocking member to extend through the opening past the outer surface in the released state.

14. The system of claim 9,
wherein the releasing mechanism comprises:
a releasing tab; and
a release member attached to the releasing tab and coupled to a releasing spring,
wherein the blocking mechanism comprises:
a blocking tab coupled to a blocking member; and
a blocking spring coupled to the blocking tab, wherein in the unreleased state, the releasing tab is between the outer surface and the blocking tab to compress the blocking spring and inhibit the blocking spring from decompressing to bias the blocking member through the opening on the outer surface.

15. A method for blocking access to a storage cartridge having a storage medium for insertion into a storage drive to read and write to the storage medium, comprising:
providing a storage cartridge having an outer surface, a blocking mechanism disposed within the storage cartridge, and a releasing mechanism coupled to the blocking mechanism in an unreleased state, wherein in the unreleased state an end of the blocking mechanism is positioned at an opening in the outer surface; and
applying a force to the releasing mechanism in the unreleased state to urge the blocking mechanism to extend through the opening past the outer surface in a released state in a manner that prevents the storage cartridge from being inserted into the storage drive.

16. The method of claim 15,
wherein the releasing mechanism comprises:
a releasing tab; and
a releasing member attached to the releasing tab and coupled to a releasing spring, wherein the applying the force to the releasing mechanism comprises applying the force to the releasing member to cause the blocking mechanism to transition from the unreleased state to the released state, and
wherein the blocking mechanism comprises:
a blocking tab coupled to a blocking member; and
a blocking spring coupled to the blocking tab, wherein in the unreleased state, the releasing tab is between the outer surface and the blocking tab to compress the blocking spring and inhibit the blocking spring from decompressing to bias the blocking member through the opening on the outer surface.

17. The method of claim 16, further comprising:
ceasing the applying the force to the releasing mechanism to cause the releasing spiring to decompress and bias the releasing tab to move under the blocking tab to the released state.

18. The method of claim 16, wherein the force applied to the releasing member comprises a first force, further comprising:
applying a second force to the releasing member in a first direction to compress the releasing spring to move the releasing tab past the blocking tab allowing the blocking spring to decompress and bias the blocking member and the blocking tab in a second direction toward the outer surface past the releasing tab to move the blocking member through the opening to transition to the released state in which the blocking tab is between the outer surface and the releasing tab.

19. The method of claim 18, wherein the force comprises a first force, further comprising:
applying a third force to the releasing member to bias the releasing member and releasing tab forward, compressing the releasing spring, past the blocking tab;
while applying the second force to the releasing member, applying a third force to the blocking member to bias the blocking member into the opening, to bias the blocking tab past the releasing tab forward away from the outer surface, thereby compressing the blocking spring so that the blocking tab is positioned below the releasing tab with respect to the outer surface; and
while applying the third force to the blocking member to compress the blocking spring and maintain the blocking tab below the releasing tab with respect to the outer surface, ceasing applying the second force to the releasing member to cause the releasing spring to decompress to bias the releasing tab to slide above the blocking tab with respect to the outer surface to apply downward force to the blocking tab to maintain the blocking spring compressed in the unreleased state.

20. The method of claim 19, further comprising:
ceasing applying the third force to the blocking member to allow the blocking tab to engage the releasing tab in the unreleased state.

\* \* \* \* \*